US006819808B2

(12) United States Patent
Erben et al.

(10) Patent No.: US 6,819,808 B2
(45) Date of Patent: Nov. 16, 2004

(54) ELECTRO-OPTICAL MODULATORS

(75) Inventors: Christoph Georg Erben, Berkeley Heights, NJ (US); Douglas M Gill, Hoboken, NJ (US); Howard Edan Katz, Summit, NJ (US); Mark Lee, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/762,976

(22) Filed: Jan. 22, 2004

(65) Prior Publication Data

US 2004/0151415 A1 Aug. 5, 2004

Related U.S. Application Data

(62) Division of application No. 10/032,798, filed on Dec. 26, 2001, now Pat. No. 6,711,308.

(51) Int. Cl.⁷ ............................................. G02F 1/035
(52) U.S. Cl. ................................................. 385/2; 385/1
(58) Field of Search ............................... 385/1, 2, 3, 4, 385/5, 6, 7, 8, 9, 10, 14, 129, 130, 131

(56) References Cited

U.S. PATENT DOCUMENTS

| | | | |
|---|---|---|---|
| 4,306,767 A | 12/1981 | Kawachi et al. | 350/96.33 |
| 4,936,645 A | 6/1990 | Yoon et al. | 350/96.14 |
| 5,067,828 A | 11/1991 | Sullivan et al. | 385/3 |
| 5,076,658 A | 12/1991 | Hayden et al. | 385/1 |
| 5,303,079 A | 4/1994 | Gnauck et al. | 359/188 |
| 5,455,876 A | 10/1995 | Hopfer et al. | 385/2 |
| 5,473,711 A | 12/1995 | Hakogi et al. | 385/14 |
| 5,649,045 A | 7/1997 | Fjare et al. | 385/145 |
| 6,198,855 B1 | 3/2001 | Hallemeier et al. | 385/2 |
| 6,310,700 B1 | 10/2001 | Betts | 359/2 |
| 6,571,026 B2 | 5/2003 | Kondo et al. | 385/2 |
| 2002/0076128 A1 | 6/2002 | LoCascio et al. | 385/5 |

OTHER PUBLICATIONS

Wang, W. et al., "*40–GHz Polymer Electrooptic Phase Modulators,*" IEEE Photonics Technology Letters, vol. 7, No. 6, Jun. 1995, pp. 638–640.
Shi, Y. et al., "*Fabrication and Characterization of High–Speed Polyurethane–Disperse Red 19 Integrated Electrooptic Modulators for Analog System Applications,*" IEEE Journal of Selected Topics in Quantum Electronics, vol. 2, No. 2, Jun. 1996, pp. 289–299.
Wang, W. et al., "*Optical heterodyne detection of 60 GHz electro–optic modulation from polymer waveguide modulators,*" Applied Physics Letters, vol. 67, No. 13, Sep. 25, 1995, pp. 1806–1808.
Chen, D. et al., "*Demonstration of 110 GHz electro–optic polymer modulators,*" Applied Physics Letters, vol. 70, No. 25, Jun. 23, 1997, pp. 3335–3337.
Bes, L., et al., "*Synthesis And Microwave Characterizations of Crosslinked Oligoimide,*" (Elsevier Science S.A.), Synthetic Metals 115 (2000), pp. 251–256.
Min, Y.H., et al., "*Mach–Zehnder Electro–Optic Modulator Based On Organic–Silica Sol–Gel Hybrid Films,*" IEEE, Electronics Letters, Sep. 30, 1999, vol. 35, No. 20, pp. 1770–1771.

*Primary Examiner*—Michael R. Statira
*Assistant Examiner*—Juan Valentin, II
(74) *Attorney, Agent, or Firm*—John F. McCabe

(57) ABSTRACT

A method includes transmitting a sequence of wavefronts of the optical carrier wave having a first wavelength to an optical waveguide and transmitting a control wave having a second wavelength to a control waveguide. The control wave electro-optically modulates velocities of the wavefronts in the optical waveguide. A dielectric cladding adjacent the optical waveguide has a refractive index at the second wavelength that is larger than the refractive index in the optical waveguide at the first wavelength.

6 Claims, 5 Drawing Sheets

ELECTRO-OPTICAL MODULATORS

This is a divisional of application Ser. No. 10/032,798 filed on Dec. 26, 2001, now U.S. Pat. No. 6,711,308.

BACKGROUND

1. Field of the Invention

The inventions relate generally to optical telecommunications and, more particularly, to electro-optical modulators.

2. Discussion of the Related Art

One goal of telecommunications research is to increase transmission rates for digital data. Presently, optical transmitters transmit digital data at rates that are below desired values. The transmission rate of an optical transmitter is, in part, limited by the frequency at which a modulator is able to encode data onto a continuous optical carrier wave.

Typically, modulators amplitude-encode data onto the optical carrier wave using microwave or millimeter control waves. The control waves electro-optically modulate refractive indexes in optical waveguides of the modulator. The optical waveguides form arms of an optical interferometer. By modulating refractive indexes, the control waves modulate propagation times in the arms of the interferometer and thus, intensity distributions produced by the interferometer. From the interferometer, the pattern is sent to an output optical waveguide whose coupling depends on the received intensity distribution. Thus, the optical wave transmitted by the output waveguide, i.e., the modulator's output optical wave is amplitude-modulated by the control waves that control the form of the interference pattern.

For optimal modulation, velocities of the control and carrier waves should be matched in the electro-optical modulator. Otherwise, wavefronts of the control wave corresponding to different data periods will modulate the same portion of the optical carrier wave. The accuracy of the match between velocities of control and optical carrier waves provides an upper limit on the operating frequency of an electro-optical modulator.

SUMMARY

In optical modulators, mismatches between control and optical carrier wave velocities occur for several reasons. First, optical wavelengths are typically between about 1.3 microns and about 1.7 microns and control wave wavelengths are typically in the centimeter to submillimeter. Since refractive indexes of the modulator's dielectrics depend on wavelength, this wavelength dependence tends to produce a velocity mismatch between the optical carrier and control waves. Second, control waves include fringe field components, i.e., fields in air or vacuum. Since propagation velocities are higher in air and vacuum, fringe field components tend to make control-wave velocities higher than those of optical carrier waves, which propagate in condensed dielectrics of the electro-optical modulator.

In one aspect, methods are provided for operating electro-optical modulators that reduce desynchronization between control and optical carrier waves therein.

One embodiment features a method that includes transmitting a sequence of wavefronts of an optical carrier wave having a first wavelength to an optical waveguide and transmitting a control wave having a second wavelength to a control waveguide. The control wave electro-optically modulates velocities of the wavefronts in the optical waveguide. A dielectric cladding adjacent the optical waveguide has a refractive index at the second wavelength that is larger than the refractive index in the optical waveguide at the first wavelength.

DETAILED DESCRIPTION OF ILLUSTRATIVE EMBODIMENTS

Figure 1:
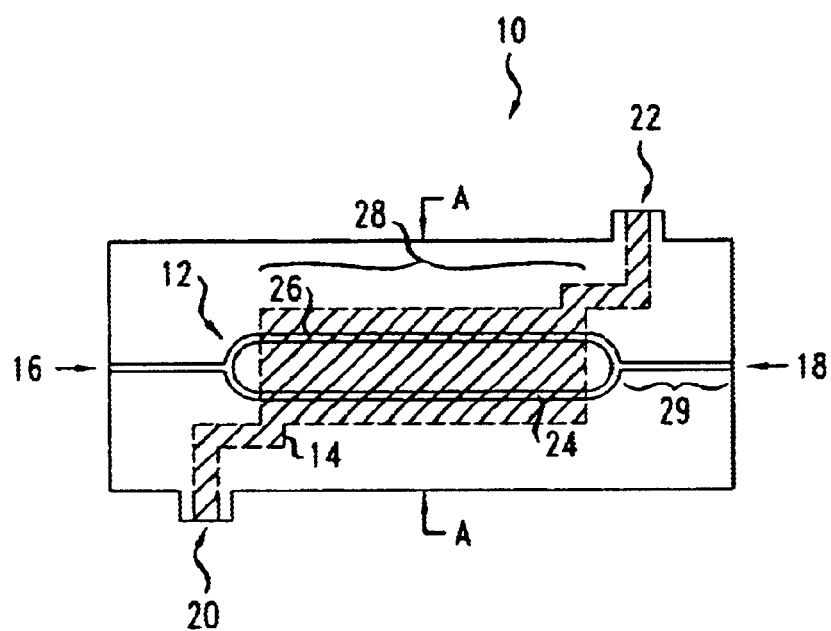
FIG. 1 is a top view of an electro-optical modulator with a stripline control waveguide geometry.

FIG. 1 is a top view of an electro-optical modulator 10. The electro-optical modulator 10 includes an optical waveguide 12 and a control waveguide 14. The optical waveguide 12 includes input and output terminals 16, 18 and an internal Mach-Zehnder interferometer. The Mach-Zehnder interferometer includes two arms 24, 26, i.e., two separate optical waveguides. The control waveguide 14 includes input and output terminals 20, 22 and a channel portion that passes through the interior of the electro-optical modulator 10. The input and output terminals 20, 22 of the control waveguide 14 connect to an external driver for control waves, i.e., microwaves, millimeter waves, or sub-millimeter waves, and to an anti-reflection termination, respectively (both not shown).

Herein, microwaves, millimeter waves, and submillimeter waves have wavelengths in the approximate ranges of (1 cm, 100 cm], (0.1 cm, 1.0 cm], and [0.01 cm, 0.1 cm], respectively.

The electro-optical modulator 10 includes an interaction region 28 where control waves propagating in control waveguide 14 electro-optically couple to the media of optical waveguide 12. In the interaction region 28, control waves produce strong electric fields in the media of optical waveguide 14. The electric fields modify propagation times of the optical carrier wave in the interaction region 28 by electro-optically modifying refractive indexes in arms 24, 26 of the Mach Zehnder interferometer.

To enhance the coupling of control waves, the optical and control waveguides 12, 14 are collinear, i.e., run along each other, in the interaction region 28. The control waveguide 14 overlaps the optical waveguide 12, because the optical waveguide 12 is sandwiched between electrodes of the control waveguide 14 in the interaction region 28. In the interaction region 28, the relative position of the optical and control waveguides 12, 14 insures that strong electric fields produced by control waves couple to media in cores of the optical waveguide 12.

Other exemplary electro-optical modulators have similar geometries except that control wave guides are adjacent to rather than surrounding optical waveguides (see below FIGS. 5A–5B). In such electro-optical modulators, control waveguides still overlap optical waveguides, because the control waveguides produce electric field intensities in the optical waveguides, and the produced electric field intensities are strong enough to measurably change propagation times in the optical waveguides, e.g., by optical interference measurements.

In the interaction region 28, the optical waveguide 12 includes two parallel and separate optical waveguides, i.e., arms 24, 26 of the Mach-Zehnder interferometer. The two optical waveguides react differently to the electric fields of the control waves, i.e., refractive indexes respond differently in the two optical waveguides to the electric fields. In exemplary embodiments, the electric field of a control wave causes the refractive index to increase in one of the optical waveguides and to decrease in the other of the optical waveguides. The opposite reactions of refractive indexes to electric fields of control waves results from oppositely oriented permanent polarizations in optical waveguides.

By making the refractive index increase in one arm 24, 26 and decrease in the other arm 26, 24, a control wave changes the relative optical path length difference between the arms 24, 26 of the interferometer. The change to the relative optical path length difference changes the relative phase of the mutually coherent optical beams leaving the arms 24, 26 and thus, changes the intensity distribution that interference produces at the output of the Mach-Zehnder interferometer. Changing the intensity distribution also changes the optical intensity output by electro-optical modulator 10, because the intensity distribution determines the optical coupling to output optical waveguide 29, i.e, the end section of optical waveguide 12. Thus, modulating refractive indexes in the interaction region 28 enables control waves to modulate intensities of the optical carrier wave output by the electro-optical modulator 10 at output terminal 18.

As a wavefront of the optical carrier wave propagates through interaction region 28 a time and phase delay accumulates. Thus, optimal modulation of the optical carrier wave occurs if the control and optical carrier waves co-propagate in interaction region 28. If the two waves co-propagate, one wavefront of the control wave produces the whole time and phase delay that a specific wavefront of the optical carrier wave receives while propagating through the interaction region 28. On the other hand, if the two waves do not co-propagate, the waves become desynchronized as they propagate along the interaction region 28 and different wavefronts of the control wave will contribute to the time and phase delay accumulated by a specific wavefront of the optical carrier.

Differences in velocities of the control and optical carrier waves cause sequential wavefronts of the control wave to contribute to the modulation of the same wavefront of the optical carrier wave in interaction region 28. Since different digital data is carried by sequential wavefronts of the control wave, modulation of the same wavefront of optical carrier wave by different wavefronts of the control wave leads to modulation errors at high data rates. The difference between the velocities of the control and optical carrier waves in interaction region 28 significantly contributes to fixing the upper data rate for error-free modulation.

To optimize the upper modulation frequency, control and optical carrier waves need matching velocities in the interaction region 28. To match velocities, the electro-optical modulator 10 is constructed so that the control and optical carrier waves see similar average values of refractive indexes in the dielectric interior of the electro-optical modulator. But, an exact matching of the average refractive indexes seen by control and optical carrier waves is disadvantageous, because only control waves have fringe fields. The fringe fields propagate in air or vacuum where velocities are higher than in the condensed dielectrics of the electro-optical modulator 10. The presence of such fringe fields tends to speed up control waves relative to optical carrier waves that do not have such fields.

In the interaction region 28, the average refractive index of the condensed-phase dielectric of electro-optical modulator 10 compensates for fringe fields, which would otherwise cause control waves to propagate faster than optical carrier waves. In particular, the average refractive index of the electro-optical modulator's condensed-phase dielectric, at the control wave's wavelength, is slightly larger than the refractive index in the optical waveguides of the interferometer, i.e., arms 24, 26, at the optical carrier wave's wavelength. Thus, control waves experience a larger average refractive index than optical carrier waves inside the electo-optical modulator 10. This larger average index tends to slow down control waves with respect to optical carrier waves and is adjusted through the choice of refractive indexes to cancel speeding up effects caused by fringe fields of the control waves.

Figure 2:
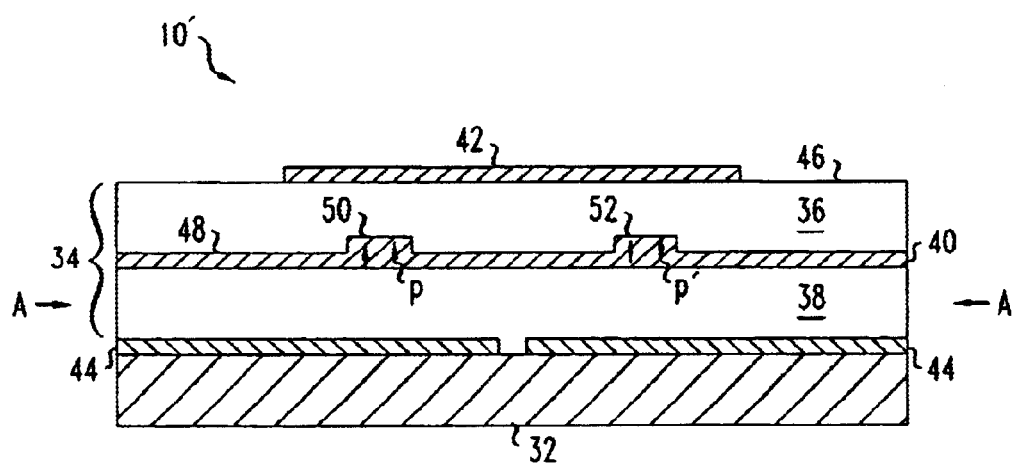
FIG. 2 is a cross-sectional view of one embodiment of the electro-optical modulator of FIG. 1.

FIG. 2 shows a cross-sectional view through the interaction region 28 of one embodiment 10' of electro-optical modulator 10, shown in FIG. 1. The electro-optical modulator 10' includes a rigid support 32, e.g., a quartz substrate, and a planar optical waveguide 34 on the rigid support 32. The planar optical waveguide includes optical cladding layers 36, 38 and an optical core layer 40 sandwiched between the optical cladding layers 36, 38. The electro-optical modulator 10' also includes top and bottom electrodes 42, 44 that define the geometry of control waveguide 14 of FIG. 1. The top electrode 42 is located on external surface 46 of the top cladding layer 36. A pair of bottom electrodes 44 is located at the interface between the lower cladding layer 38 and the rigid support 32.

The core and cladding layers 40, 36, 38 form a structure that vertically and laterally confines optical carrier light propagating therein. The vertical confinement results, because the core layer 40 has a higher refractive index than the cladding layers 36, 38 at the optical carrier wave's wavelength. The lateral confinement results because of the shape of the interface 48 between the top cladding layer 36 and the core layer 40. In particular, the core layer 40 has raised rectangular ridges 50, 52 where material with a higher refractive index penetrates into the top cladding layer 36. The portion of the core layer 40 below each ridge 50, 52 functions as an optical core of one of the optical waveguides of Mach Zehnder interferometer, i.e., arms 24 and 26 of FIG. 1.

In the Mach Zehnder interferometer, the optical waveguides have permanent polarizations P, P' in the portions of core layer 40 that are located below ridges 50, 52. The permanent polarizations P, P' are oriented normal to the surface of the core layer 40 and are mutually anti-parallel.

One method of producing the permanent polarizations P, P' involves poling regions of the core layer 40 below the ridges 50, 52 with oppositely oriented electric fields. Such electric poling techniques for producing permanent polarizations in dielectrics are known to those of skill in the art.

The top and bottom electrodes 42, 44 are microstrips of gold or another metal and run longitudinally along the optical waveguides corresponding to arms 24, 26 to define the collinear portion of the control waveguide 14 in the interaction region 28 as shown in FIG. 1. The electrodes 42, 44 carry currents that propagate along with the control wave in the electro-optical modulator 10'. The electrodes 42, 44 are positioned so that the control waveguide 14 overlaps the optical waveguides defined by ridges 50, 52 in the interaction region 28. In fact, the shown control waveguide 14 surrounds the optical waveguides. This relative positioning of control and optical waveguides aids electric fields produced by control waves to better penetrate the optical waveguides and more efficiently electro-optically modulate refractive indexes therein.

An exemplary electro-optical modulator 10' uses millimeter- or submillimeter-control waves to modulate a continuous optical carrier wave whose wavelength is in the range of about 1.3 microns to about 1.7 microns. In the exemplary electro-optical modulator 10', the interaction region 28 is about 2–3 centimeters long and the top and bottom electrodes 42, 44 are gold and about 30 microns wide. The bottom electrodes 44 are separated from the top electrodes 42 by a gap of about 10 microns.

In the exemplary electro-optical modulator 10', the cladding and core layers 36, 38, 40 are polymer layers. The cladding layers 36, 38 are about 6–7 microns thick and made of polysilsesquioxanes or of polymers with P—O bonds. The core layer 40 is about 1.75 microns thick and is made of an organic dielectric whose refractive index is highly responsive to electric fields, i.e., within an order of magnitude as responsive as $LiNbO_3$ or higher. One exemplary core layer 40 is 80 weight % poly(methyl methacrylate) (Hereinafter, PMMA.) and 20 weight % dye, e.g., N-ethyl-N-(2-hydroxyethyl)-4-(4-nitrophenylazo)aniline (Hereinafter, E—O dye.). This exemplary core layer also has a refractive index, at 1.3 to 1.7 microns, which is much closer to that of the cladding layers 36, 38, at microwave, millimeter-wave or submillimeter-wave wavelengths than in $LiNbO_3$ type modulators. The closeness of these two refractive indexes at the very different control wave's wavelength and optical carrier wave's wavelength enables approximate velocity matching of these two types of wave in the exemplary optical modulator 10'.

In the core layer 40, the ridges 50, 52 are about 0.25–0.30 microns high and about 5 microns wide. The ridges 50, 52 are positioned about 20 microns apart to provide adequate optical isolation between the two waveguides of the Mach-Zehnder interferometer, i.e., between arms 24, 26 of FIG. 1.

In core layer 40, the refractive index is about 1.54, at a 1.3 micron wavelength, and is about 1.7, at a millimeter wave wavelengths.

In cladding layers 36, 38, the refractive index is about 1.48, at a 1.3 micron optical wavelength and is about 1.7, at a millimeter wave wavelength. Thus, the average refractive index in the cladding layers 36, 38 is about 10–15 percent higher, at millimeter control wave wavelengths, than the refractive index of core layer 40, at the 1.3 micron optical carrier wave wavelength. A difference of about 5% to about 20% and preferably of about 10% to about 15% between average refractive indexes seen by the optical carrier and the control waves enables matching velocities of the two types of waves in the stripline geometry of FIGS. 1–2.

For the exemplary dimensions and refractive indexes in electro-optical modulator 10', control and optical carrier wave velocities match to about 5 percent or better in the interaction region 28. For 5 percent velocity matches, the modulator 10' produces a modulation amplitude with a 3 decibel bandwidth of about 100 giga-Hertz. An 80/20 weight % PMMA/E—O dye composition in core layer 40 increases the maximum modulation amplitude, i.e., at low frequency. If the core layer 40 has a PMMA polymer matrix, modulation frequencies of 200 giga-Hertz and higher are obtainable.

In another embodiment, the upper cladding layer 36 is a polymer and the lower cladding layer 38 is $SiO_2$. At a 1.3 micron optical wavelength, these upper and lower cladding layers 36 and 38 have respective refractive indexes of about 1.48 and 1.45. At millimeter wave wavelengths, the lower cladding 38 has a refractive index of about 2.0, and the upper cladding 36 has a refractive index of about 1.7. Thus, the $SiO_2$ layer increases the average cladding refractive index above the value in the above-described exemplary embodiment in which both cladding layers 36, 38 had the same refractive indexes. Due to the higher average cladding refractive index, the refractive index of core layer 40 must be lowered, at control-wave wavelengths, to velocity match control and optical carrier waves. Lowering the core's refractive index increases the refractive index contrast between cladding and core layers 36, 38, 40. This higher contrast increases intensities of electric fields that control waves produce in the cores 50, 52 and thus, increases the responsiveness of the electro-optical modulator 10.

Figure 3:
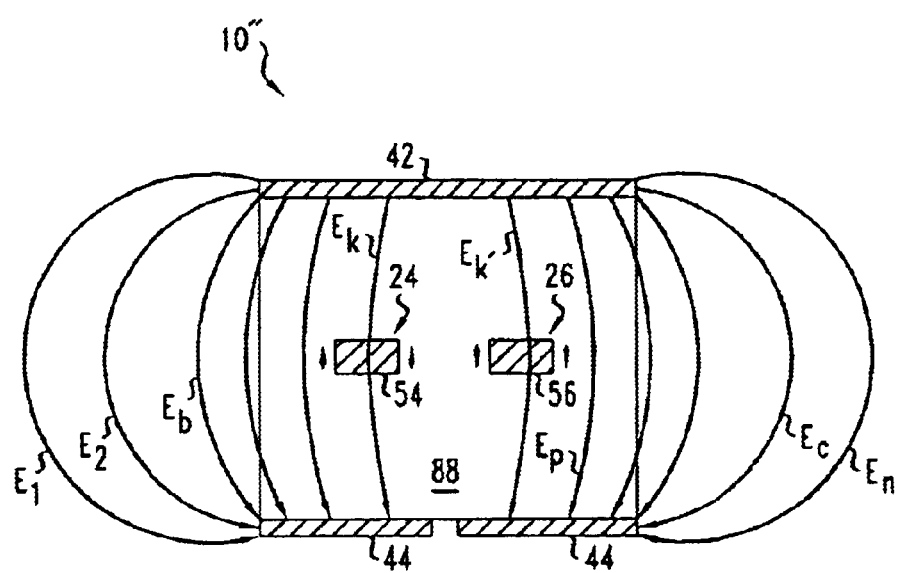
FIG. 3 is a cross-sectional view showing electric field lines in one embodiment of the electro-optical modulator of FIG. 1.

FIG. 3 shows an alternate embodiment 10" of the electro-optical modulator 10 of FIG. 1 in which arms 24, 26 of the Mach-Zehnder interferometer include optical cores 54, 56 that are both laterally and vertically surrounded by material of cladding layer 58. The dielectrics of cores 54, 56 and cladding layer 58 are the same dielectrics used in respective core layer 40 and cladding layers 36, 38 of the electro-optical modulator 10' of FIG. 2. The electro-optical modulators 10', 10" of FIGS. 2–3 have otherwise similar geometries and thus, similar fringe field structures.

FIG. 3 also shows exemplary electric field lines $E_1$–$E_N$ that a control wave instantaneously produces between top and bottom electrodes 42, 44. Some electric field lines, e.g., $E_k$, pass through the optical waveguide cores 54, 56 of the Mach-Zehnder interferometer. These lines electro-optically modulate refractive indexes therein. Other electric field lines, e.g., $E_p$, pass only through the cladding layer 58. These field lines have less importance for modulating refractive indexes seen by the optical carrier wave, because the optical carrier wave is largely confined to the optical waveguide cores 54, 56. Nevertheless, since the modulator's dielectric is primarily cladding, these field lines, e.g., $E_p$, are dominant in determining the velocity of the control wave. Finally, other electric field lines, e.g., $E_b$ and $E_c$, pass partially or completely outside the cladding layer 58. These lines are associated with fringe fields that tend to cause the control wave to speed up with respect to the optical carrier wave.

The fringe-field percentage of the energy for a control wave is fixed by geometry of the electro-optical modulator 10". But, some fringe field content is typically required by load matching constraints. In particular, microwave and millimeter wave drivers typically require terminations of about 50 ohms for efficient coupling. Such line impedance values typically require a modulator geometry in which about 10–15% of the energy of control waves is in fringe fields for the stripline geometry. For this high a percentage of energy in fringe fields, control waves typically must see a refractive index in the electro-optical modulator 10" that is about 10–15% higher than that seen by optical carrier waves. Such a mismatch in effective seen refractive indexes enables matching the velocities of the two types of waves to better than 5% and obtaining upper modulation frequencies of about 400 giga-Hertz and higher.

The geometry of the electro-optical modulators 10', 10" of FIGS. 2–3 also includes differential phase modulators. Differential phase modulators encode data by phase-modulating two optical carrier waves with modulation signals that are 180 degrees out of phase. One geometry for a differential phase modulator is similar to the geometry of modulator 10 of FIG. 1 except that the differential phase modulator does not interfere the optical carrier waves outputted by arms 24 and 26. Instead, the differential phase modulator separately outputs the optical carrier waves from the arms 24, 26.

Figure 4:
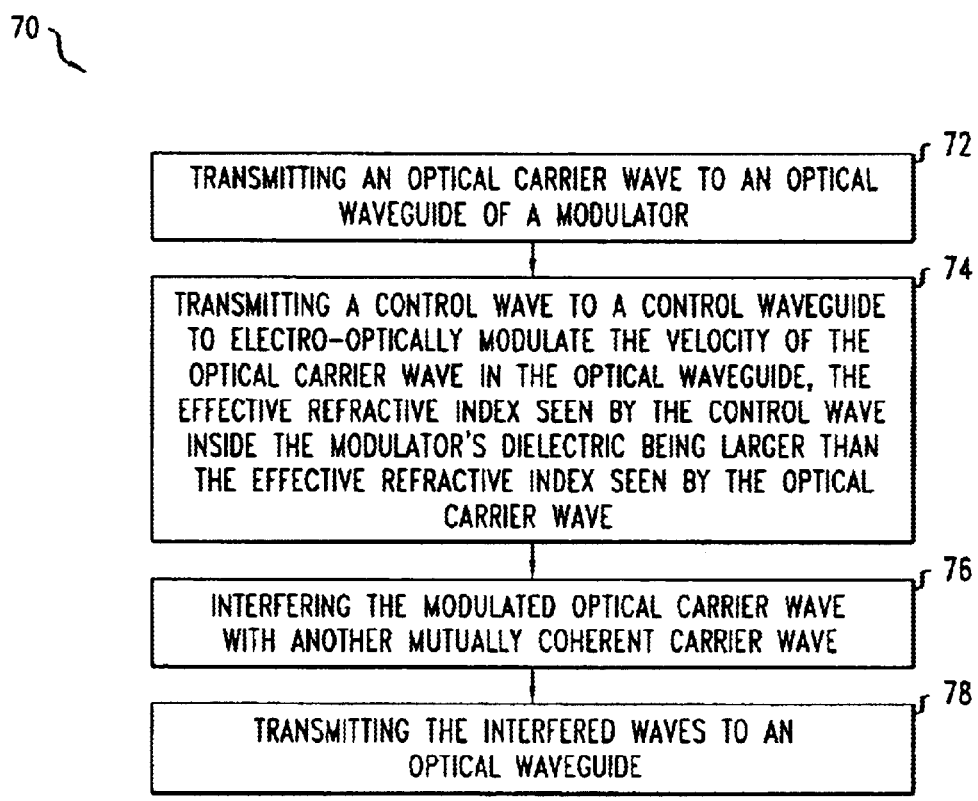
FIG. 4 is a flow chart illustrating a method of modulating an optical carrier wave with an electro-optical modulator.

FIG. 4 illustrates a method 70 for modulating an optical carrier wave with an electro-optical modulator, e.g., modulator 10 of FIG. 1. The method 70 includes transmitting a series of wavefronts of the optical carrier wave to an optical waveguide, e.g., arm 24 of FIG. 1 (step 72). The method 70 also includes simultaneously transmitting a control wave to a control waveguide, e.g., control waveguide 14 of FIG. 1, to electro-optically modulate the velocities of the wavefronts of the optical carrier wave in the optical waveguide (step 74).

The electro-optical modulator is constructed to keep the control and optical carrier waves synchronized therein. In particular, the effective refractive index seen by the portion of control wave in the modulator's dielectric is larger, e.g., by about 5% to about 20%, than the effective refractive index seen by the optical carrier wave inside the modulator. For the stripline geometry, the effective refractive index is designed to be about 10% to about 15% larger for the portion of the control wave in the modulator than for the optical carrier wave to compensate for desynchronizing effects of fringe fields. Since exemplary modulators include more dielectric cladding than core, e.g., at least 3 times as much, the control wave sees primarily the refractive index of the cladding inside the modulator. Since the optical carrier wave is largely confined to the core of the optical waveguide, the optical carrier wave sees essentially the refractive index of the core inside the modulator. Thus, inside the electro-optical modulator, the effective refractive indexes for the control and optical carrier waves are the average refractive index of the cladding and the average refractive index of the core, respectively. In preferred stripline modulators, the refractive index of the cladding, at the control wave wavelength, is selected to be larger than the refractive index of the core, at the optical carrier wave wavelength, e.g., by about 10% to about 15%.

After electro-optical modulation of velocities, the wavefronts of the optical carrier wave are interfered with wavefronts of a second mutually-coherent optical carrier wave, e.g., the optical carrier wave from arm 26 in electro-optical modulator 10 of FIG. 1 (step 76). The method 70 also includes transmitting the interfered wavefronts to an output optical waveguide with a coupling that depends on the distribution of the received light intensity, e.g., optical waveguide 29 of FIG. 1 (step 78). Thus, the light intensity in the output optical waveguide is responsive to the light distribution in the interfered wavefronts. Since the light distribution is fixed by the amount of modulation, the output optical intensity from the output waveguide and from the modulator itself is also fixed by the amount of modulation generated by the control wave.

Other embodiments of electro-optical modulators have alternate geometries that are designed to concentrate a larger percentage of the control-wave energy in fringe fields than the stripline geometries of electro-optical modulators 10, 10', 10" shown in FIGS. 1–3. Increasing the concentration of energy in fringe fields tends to cause control waves to propagate faster in electro-optical modulators. Thus, electro-optical modulators with the alternate geometries also use claddings with higher average refractive indexes at control-wave wavelengths than the claddings of the electro-optical modulators with stripline geometries. The higher average refractive indexes enable velocity matching of control waves and optical carrier waves in the electro-optical modulators with the alternate geometries.

Due to the higher refractive indexes of the claddings at control-wave wavelengths. modulators with these alternate geometries can be made with a higher cladding to core refractive index ratio at the control wave wavelength than electro-optical modulators with the stripline geometry. A higher ratio of the cladding to core refractive index ratio enables control waves to produce stronger electric fields in the optical waveguides of the electro-optical modulators with the alternate geometries. Thus, the electro-optical modulators with geometries that concentrate more of the field energy of control waves in fringe fields are capable of more efficient coupling of control waves to optical carrier waves.

Figure 5A:
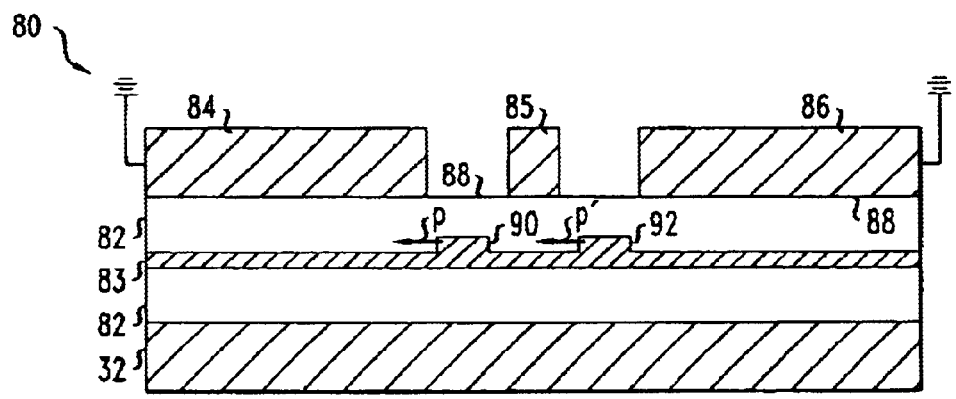
FIGS. 5A–5B are cross-sectional view of electro-optical modulators with coplanar control waveguide geometries.

FIG. 5A is a cross-sectional view through a portion of the interaction region of an electro-optical modulator 80 with an alternate geometry. The electro-optical modulator 80 includes cladding and core layers 82, 83 and gold electrodes 84–86. In an exemplary embodiment, core and cladding layers are about 3 microns and about 2–5 microns thick, respectively, and the support 32 is a thick layer of $LiNiO_3$. In the same embodiment, the electrodes 84–86 are about 25–30 microns thick and separated by lateral gaps of about 30–60 microns.

In this geometry, the optical cladding and core layers 82, 83 are not located between the electrodes 84–86 for control waveguides. Instead, the electrodes 84–86 form a stack extending laterally along an outer surface 88 of the cladding layer 82, i.e., a coplanar control waveguide geometry. This alternate geometry concentrates a larger percentage of the energy of control waves in fringe fields than the stripline geometries shown in FIGS. 1–3.

In the interaction region, two optical waveguides form the arms of a Mach-Zehnder interferometer. The optical waveguides include core regions 90, 92 and adjacent portions of the cladding 82. The two core regions 90, 92 have different placements with respect to electrodes 84–86, and thus, experience electric fields with different orientations when control waves propagate in the control waveguide. The core regions 90, 92 have permanent polarizations P, P' whose relative orientations cause electric fields produced by control waves to produce different propagation times for the optical waveguides associated with core region 90 and core region 92, respectively.

To improve the electro-optical coupling, refractive indexes of the core and cladding layers 83, 82 are selected to enhance electric field strengths inside core regions 90, 92. In particular, the refractive index at the control-wave wavelength is lower in the core layer 83 than in the cladding layer 82.

Figure 5B:
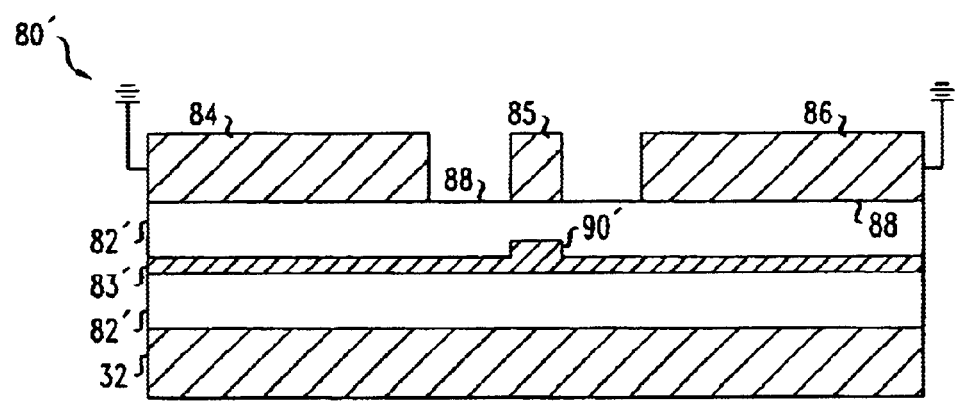

FIG. 5B is a cross-sectional view of the interaction region of another electro-optical modulator 80' with the same control waveguide geometry as the electro-optical modulator 80 of FIG. 5A. The electro-optical modulator 80' also has cladding and core layers 82', 83' with the same composition as the cladding and core layers 82, 83 of the electro-optical modulator 80 of FIG. 5A. The electro-optical modulator 80' only has a single core region 90' in the interaction region, because the modulator 80' modulates only the phase of the optical carrier wave. The phase-modulated optical carrier wave is outputted by the electro-optical modulator 80' rather than being interfered with another optical carrier wave to produce an amplitude-modulated optical carrier wave. Thus, the electro-optical modulator 80' is capable of transmitting a phase-modulated optical carrier wave to a distant external receiver (not shown), e.g., by transmission over an optical fiber or through free space.

Figure 6:
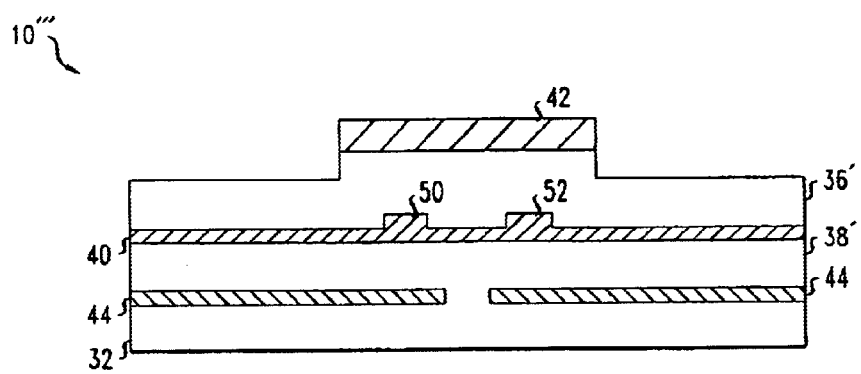
FIG. 6 is a cross-sectional view of an electro-optical modulator with an alternate stripline control waveguide geometry.

FIG. 6 is a cross-sectional view through a portion of the interaction region of an electro-optical modulator 10''' with an alternate stripline geometry. The electro-optical modulator 10''' is similar to modulator 10' shown in FIG. 2 with one difference. In the modulator 10''' of FIG. 6, the top cladding layer 36' has been lithographically etched to leave less laterally located cladding than in the electro-optical modulator 10' of FIG. 2. The reduction in the amount of laterally located cladding increases the amount of control wave energy in fringe fields. To compensate the effect of this increase in fringe field energy on propagation velocities, the dielectric of the cladding layers 36', 38' has a higher refractive index at the control wave wavelength. The cladding layers 36', 38' have refractive indexes that insure that control waves and the optical carrier co-propagate inside the electro-optical modulator 10'''. The increased refractive index in the cladding layers 36', 38' also increases strengths of electric fields that control waves produce in core layer 40 over the values produced in the electro-optical modulator 10' of FIG. 2.

Figure 7:
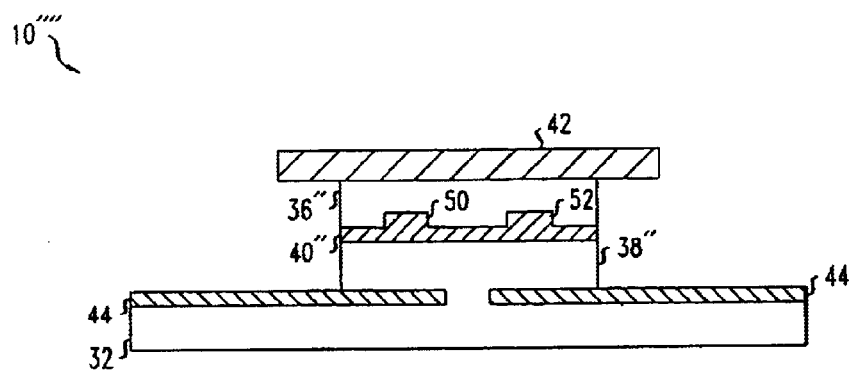
FIG. 7 is a cross-sectional view of an electro-optical modulator with an alternate stripline control waveguide geometry.

FIG. 7 is a cross-sectional view through a portion of the interaction region of an electro-optical modulator 10'''' with an alternate stripline geometry. The electro-optical modulator 10'''' has the same geometry as modulator 10' shown in FIG. 2 with one difference. Lateral portions of both cladding and core layers 36'', 38'', 40'' have been etched away so that the electro-optical modulator 10'''' of FIG. 7 concentrates more control wave energy in fringe fields than the electro-optical modulator 10' of FIG. 2. Nevertheless, propagation velocities of control and optical carrier waves match in the electro-optical modulator 10'''', because the cladding layers 36'', 38'' have higher refractive indexes at the control wave wavelength than cladding layers 36, 38 of FIG. 2. The higher cladding refractive indexes increase the electric fields intensities that control waves produce in core layer 40'' over the values obtainable in core layer 40 of FIG. 2.

From the disclosure, drawings, and claims, other embodiments of the invention will be apparent to those skilled in the art.

What is claimed is:

1. A method of electro-optically modulating an optical carrier wave with a control wave, comprising:

transmitting a sequence of wavefronts of the optical carrier wave to an optical waveguide, the optical carrier wave having a first wavelength; and transmitting a control wave having a second wavelength to a control waveguide to electro-optically modulate velocities of the wavefronts in the optical waveguide, a dielectric cladding adjacent the optical waveguide having a refractive index at the second wavelength that is larger than the refractive index in the optical waveguide at the first wavelength.

2. The method of claim 1, wherein the second wavelength is one of a microwave, a millimeter wave, and a submillimeter wave; and wherein the first wavelength is in a range of about 1.3 microns to about 1.7 microns.

3. The method of claim 1, wherein an intensity of an electric field produced by the control wave is higher inside the optical waveguide than in the portion of the cladding located adjacent the optical waveguide.

4. The method of claim 1, further comprising:

interfering the sequence of wavefronts from the optical waveguide with a sequence of wavefronts from another optical carrier wave, the another optical carrier wave being coherent with the optical carrier wave transmitted to the optical waveguide.

5. The method of claim 1, further comprising:

transmitting the wavefronts with modulated propagation times from the optical waveguide to a distant external receiver.

6. The method of claim 1, wherein a portion of the control wave in dielectric of a modulator experiences an effective refractive index that is about 5% to 20% lager than an effective refractive index experienced by the optical carrier wave inside the modulator.

* * * * *